United States Patent [19]

Hageman et al.

[11] Patent Number: 5,046,591
[45] Date of Patent: Sep. 10, 1991

[54] TORQUE CONVERTER CLUTCH WITH FLUID PRESSURE APPLIED VARIABLE FRICTION DAMPING

[75] Inventors: John B. Hageman, Vandalila; Gerald C. Danielewicz, Dayton, both of Ohio

[73] Assignee: General Motors Corporation, Detroit, Mich.

[21] Appl. No.: 627,119

[22] Filed: Dec. 13, 1990

[51] Int. Cl.$^5$ ............................................. F16H 45/02
[52] U.S. Cl. ............................... 192/3.29; 192/106.2; 464/68
[58] Field of Search ...................... 192/3.28, 3.29, 3.3, 192/30 V, 106.1, 106.2; 464/68

[56] References Cited

U.S. PATENT DOCUMENTS

| | | | |
|---|---|---|---|
| 4,027,757 | 6/1977 | Radke et al. | 192/106.2 |
| 4,143,561 | 3/1979 | Melhorn | 475/56 |
| 4,194,604 | 3/1980 | Nichols et al. | 192/3.3 |
| 4,353,444 | 10/1982 | Bionaz | 192/3.29 |
| 4,437,551 | 3/1984 | Gimmler et al. | 192/3.28 |
| 4,576,260 | 3/1986 | Koshimo | 192/3.31 |
| 4,580,668 | 4/1986 | Pickard et al. | 192/3.29 |
| 4,588,058 | 5/1986 | Aliouate | 192/106.2 |
| 4,735,297 | 4/1988 | Koshimo | 192/3.29 |
| 4,809,830 | 3/1989 | Schierling et al. | 192/3.29 |
| 4,844,222 | 7/1989 | Casse et al. | 192/3.28 |
| 4,969,544 | 11/1990 | Fujimoto | 192/3.29 |
| 4,982,821 | 1/1991 | Tanaka | 192/3.29 |

*Primary Examiner*—Richard Lorence
*Attorney, Agent, or Firm*—Donald F. Scherer

[57] ABSTRACT

A clutch vibration damper for a clutch disposed within an automatic transmission torque converter, wherein the damping between the clutch hub and the clutch pressure plate is provided by frictional drag resulting from the clutch damper being applied simultaneous with clutch engagement. The damper is rotatively locked to the clutch hub through engaging lugs. The clutch damper is frictionally engaged to the pressure plate by the apply fluid pressure which forces the pressure plate to engage the torque converter input shell.

3 Claims, 1 Drawing Sheet

TORQUE CONVERTER CLUTCH WITH FLUID PRESSURE APPLIED VARIABLE FRICTION DAMPING

TECHNICAL FIELD

This invention relates to rotary dampers used to control frictional rotary vibrations between a clutch hub and a clutch pressure plate of a clutch disposed within a torque converter used with a transmission. The exemplary embodiment described in this disclosure establishes a frictional damping piston which is rotatively locked to the clutch hub and is frictionally engageable with the pressure plate.

BACKGROUND OF THE INVENTION

Automatic transmission torque converters are often equipped with a clutch to rotatively link a torque converter turbine with a torque converter input shell. Engagement of a clutch pressure plate with the torque converter shell restricts the rotary displacement of the vehicle engine relative to a torque converter output element, eliminating the slip within an automatic transmission torque converter.

The clutch pressure plate is rotatively connected through intermediate elements to the turbine of the torque converter and to the output element of the torque converter, both of which are rotatively fixed to one another. One of the intermediate elements connecting the clutch pressure plate with the output element is a set of springs which compress to allow the clutch pressure plate to be rotatively displaced relative to the turbine and the torque converter output element. Spring compression occurs upon engagement of the clutch pressure plate with the torque converter input shell when they are rotating at different speeds and when the engaged clutch is subjected to transient torsional impulses, such as impulses produced by the engine firing frequency. Clutch engagements and the transmission of transient impulses can induce the clutch pressure plate and the elements rotatively connected to it to rotatively vibrate at a natural frequency relative to the clutch hub and the elements rotatively connected to it.

It is desirable to minimize the amplitude of these vibrations. A common method of minimizing and reducing the magnitude of the vibrations is to apply a rotary frictional load between the clutch pressure plate and the torque converter output element, in parallel with the rotative spring force of the clutch springs. The result is to damp out the vibrations between the clutch pressure plate and the torque converter output element. The rotary frictional load is typically applied by an axial spring force in series with the frictional element.

SUMMARY OF THE INVENTION

This invention has several advantages and features that distinguish it from prior art frictional rotary dampers used in torque converters. These advantages result from the use of fluid pressure in place of axial spring force to apply to the clutch damper. Fluid pressure application of the damper allows the frictional damping load to be varied by changing the piston area of the damper or by varying the apply pressure. This contrasts with a system using an axial spring load which requires changing the spring load to increase the frictional load. The use of a pressure applied damper eliminates the need for axial springs, reducing the number of parts within the transmission.

It is an object of this invention to provide an improved damper for a clutch within an automatic transmission torque converter, comprising a damping piston disposed between a clutch hub and a clutch pressure plate, rotatively locked to the clutch hub and movable axially relative to the clutch pressure plate, having a friction element on a side of the damping piston facing the pressure plate, the pressure plate having vent orifices located on a diameter less than an inside diameter of the clutch friction element, the clutch damper being engageable with an apply side of the pressure plate during selective engagement of the pressure plate with an engagement surface of the torque converter input shell.

It is also an object of this invention to provide an improved damper for a clutch within an automatic transmission, comprising a damping piston disposed adjacent to the apply side of the pressure plate, axially positioned in close proximity to the pressure plate by spring means, and with a plurality of openings for rotative locking to a clutch hub by engagement with lugs axially extending from the clutch hub, a friction element fixed on a side of the damping piston facing the pressure plate, and the pressure plate having vent orifices located on a diameter less than a minimum diameter of rotation of the friction element.

It is a further object of this invention to provide an improved damper for a clutch within an automatic transmission torque converter, comprising a damper piston coaxial with a clutch pressure plate, with a friction element fixed on a friction element side, applied against the pressure plate by fluid pressure simultaneous to fluid pressure on the apply side of the pressure plate applying the pressure plate against an engaging surface of a torque converter input shell, rotatively fixed to a torque converter output element and axially movable relative to the clutch pressure plate, with means to allow fluid trapped between the pressure plate and the damper piston during an apply of the clutch to escape from the apply side to the release side of the pressure plate element.

These and other objects and advantages will be more apparent from the following description and drawings.

DESCRIPTION OF THE PREFERRED EMBODIMENT

Figures 1, 2:
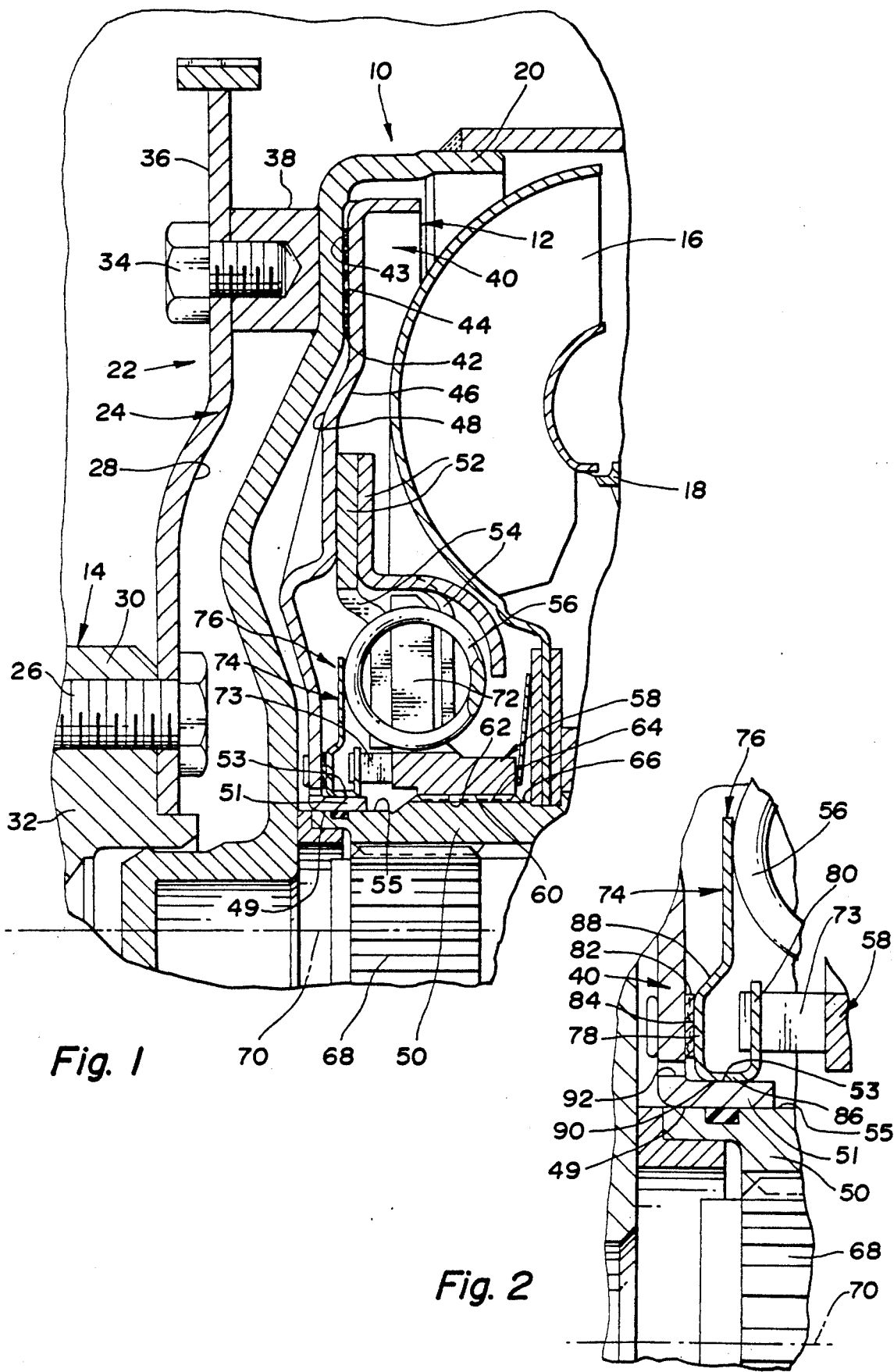
FIG. 1 is a sectional view of the relevant parts of the torque converter and the engine to torque converter attachment.
FIG. 2 is an enlarged sectional view of the clutch damper portion of the torque converter.

FIG. 1 shows a torque converter 10, for a transmission (not shown) in a vehicle (not shown), having a selectively engageable internally disposed friction clutch 12, and adapted to be driven by a vehicle engine 14. The torque converter 10, is a conventional fluid drive mechanism and includes a turbine 16 and a stator 18 disposed in toroidal flow relation with an impeller (not shown), all disposed within a torque converter input shell 20. The impeller is secured for rotation with the torque converter input shell 20. The torque converter input shell 20 has a rigid rotary connection 22 to the engine 14 provided by a flexplate 24 with bolts 26 passing from a torque converter side 28 of the flexplate 24 through to a flange 30 on the end of an engine crankshaft 32 and by bolts 34 passing through the flexplate 24 from the engine side 36 of the flexplate 24 and threading into threaded bosses 38 on the torque converter input shell 20.

Disposed between the turbine 16 and the torque converter input shell 20 in the direction of the engine 14 is the clutch 12. The clutch 12 includes an annularly shaped clutch pressure plate 40, and a friction pad 42 at an outer periphery 43 of the pressure plate 40, adapted to frictionally engage a complementary clutch engagement surface 44 of the input shell 20. The clutch pressure plate 40 has both an apply side 46 and a release side 48. The friction pad 42 is on the release side 48 of the clutch pressure plate 40 which faces the clutch engaging surface 44 of the input shell 20. The apply side 46 of the clutch pressure plate 40 faces the turbine 16. The clutch pressure plate 40 has a lip 51 which defines an inside diameter 49 of the clutch pressure plate. The lip 51 has a concentric outside diameter 53 and projects toward the turbine.

The clutch pressure plate 40 is rotatively supported on a turbine hub 50. The inside diameter 49 of the clutch pressure plate lip 51 pilots on a pilot diameter 55 of the turbine hub 50. The clutch pressure plate 40 has a spring engagement portion 52 with a plurality of openings 54 to accommodate clutch springs 56. The openings 54 are of approximately the same shape and size as the springs 56 in their free state. The spring engagement portion 52 is concentric with and rotatively locked to the clutch pressure plate 40.

A clutch hub 58 links the clutch pressure plate 40 to the turbine hub 50. The clutch hub 58 is rotatively fixed through splines 60 on an inside diameter 62 to the turbine hub 50 through complementary splines 64 on an outside diameter 66. The splines 60 and 64 allow only relative axial movement between the hubs 50 and 58. The turbine hub 50 in turn is splined to an output element 68 which drives a gear system (not shown) within the transmission. An axis of rotation 70 of the output element 68 is the axis of rotation 70 for all elements of the torque converter 10, including the clutch pressure plate 40 and the torque converter input shell 20.

The clutch pressure plate 40 and clutch hub 58 interface so as to prevent axial movement of the clutch pressure plate 40 relative to the clutch hub 58. The clutch hub 58 has openings 72 for clutch springs 56 corresponding to the openings 54 in the spring engagement portion 52 of the clutch pressure plate 40. The clutch springs 56 are interposed between the clutch hub 58 and the spring engagement portion 52 of the pressure plate 40 to minimize the harshness of the torsional vibrations transmitted from the clutch pressure plate 40 to the clutch hub 58. The clutch springs 56 are disposed in the openings 54 and 72 so as to be axially compressed whenever there is rotary displacement of the clutch pressure plate 40 relative to the clutch hub 58. The clutch hub 58 also has a plurality of lugs 73 which extend axially toward but do not engage the pressure plate 40.

FIG. 2 shows the area of the torque converter damper in greater detail than FIG. 1. The torque converter clutch damper 74 has as its central element a clutch damper piston 76. The clutch damper piston 76 has two parallel sides 78 and 80, an annularly shaped friction element side 78 with a friction element 82 on an outboard side 84, and an engaging side 80 with a plurality of openings (not shown) disposed for engagement with the clutch hub lugs 73. A piloting section 86 is intermediately disposed between the friction element side 78 and the engaging side 80 joining the two sides 78 and 80. The friction element side 78 extends radially outward to contact the clutch springs 56. There may be an offset 88 in the friction element side 78 between where the friction element 82 is fixed to the outboard surface 84 of the friction element side 78 and where the friction element side 78 contacts the clutch springs 56. The piloting section 86 of the damper piston 76 has an inside diameter 90 which pilots on the outside diameter 53 of the pressure plate lip 51. The pressure plate 40 has vent orifices 92 located radially inward of the friction element 82 such that the friction element 82 does not contact the vent orifices 92.

The advantages of this invention become more apparent when observing the system in operation.

The clutch 12 typically remains disengaged during vehicle acceleration because the torque multiplying effect of the torque converter 10 is desired to aid in vehicle acceleration. Clutch 12 engagement usually occurs after the acceleration rate decreases. Engagement is initiated per a schedule (not shown) which is a function of throttle position and vehicle speed.

When a combination of vehicle speed and throttle position corresponding to an engagement point in the schedule is reached, the clutch 12 is applied by supplying transmission fluid under pressure to the apply side 46 of the clutch pressure plate 40. This forces the clutch pressure plate 40 and the clutch hub 58 to translate axially toward the torque converter input shell 20 until the friction pad 42 on the torque converter shell 20 comes into contact with the complementary clutch engagement surface 44 on the torque converter input shell 20.

There will, for most clutch engagements, be a rotational speed differential between the two elements 20 and 40. The rotational speed differential results in torque being developed upon engagement of the clutch pressure plate 40 with the torque converter input shell 20. The magnitude of torque is dependent in part on the relative rotational speed of the engaging elements 20 and 40, the rotary inertias of the engaging elements 20 and 40, and the rotary inertias of elements rotatively linked to the engaging elements 20 and 40.

The torque is transmitted through the clutch pressure plate 40 into the clutch springs 56, through the clutch springs 56 to the clutch hub 58, to the turbine hub 50 and into the torque converter output element 68. The clutch springs 56 between the clutch pressure plate 40 and the clutch hub 58 are compressed when transmitting torque, allowing torsional displacement between the clutch pressure plate 40 and the clutch hub 58. The deflection of the clutch springs 56 minimizes the harshness of the torque transmitted between the clutch pressure plate 40 and the clutch hub 58, such as that produced by the engagement of the clutch pressure plate 40 with the torque converter input shell 20, or the impact of the cylinder firings of the engine 14 on the output element 68. The relative deflections of the clutch pressure plate 40 and the clutch hub 58 are damped by the clutch damper 74.

The contact between the clutch springs 56 and the clutch damper 74 keeps the damper sufficiently close to the pressure plate so that when fluid pressure is applied to the apply side 46 of the pressure plate 40, the oil in the void between the friction element 82, the damper piston 76, and the pressure plate 40 is at a lower pressure than the rest of the oil on the apply side 46. The friction element 82 of the clutch damper 74 is pressed against the pressure plate 40 when transmission apply fluid is applied to the apply side 46 of the pressure plate 40. Fluid pressure in the void between the pressure plate 40 and the clutch damper 74 is relieved by the vent orifices 92 in the pressure plate 40, allowing torque to develop between the friction element 82 of the clutch damper 74 and the pressure plate 40.

The axial lugs 73 of the clutch hub 58 permit the damper 74 to translate axially along the axis of rotation 70 while preventing rotation of the damper 74 relative to the clutch hub 58. When the clutch damper 74 is applied, the engagement with the clutch hub lugs 73 prevents the damper from traveling with the pressure plate. The damper 14 remains rotatively locked to the clutch hub 58 and provides a frictional damping load to the clutch pressure plate 40 as the pressure plate 40 and damper 74 are simultaneously applied.

Obviously, many modifications and variations of the present invention are possible in view of the above teaching. It is therefore to be understood, that within the scope of the appended claims, the invention may be practiced otherwise than as specifically described.

The embodiments of the invention in which an exclusive property or privilege is claimed are defined as follows:

1. A damper for a selectively engageable friction clutch disposed within a torque converter functionally interposed between a vehicle engine and a vehicle transmission, comprising:

the friction clutch comprising a clutch pressure plate having an apply side and a release side, being selectively engageable to the engine through a torque converter input shell, and rotatively supported on a turbine hub, a clutch hub rotatively fixed and axially movable relative to the turbine hub, and springs disposed between and rotatively linking the clutch pressure plate and the clutch hub, oriented to deflect when torque is transmitted between the clutch hub and the clutch pressure plate;

the clutch pressure plate being selectively engageable with the input shell in response to fluid pressure being applied to the apply side of the pressure plate;

the torque converter clutch damper comprising a damping piston disposed between the clutch hub and the clutch pressure plate, rotatively locked to the clutch hub and movable axially relative to the clutch pressure plate, and a friction element on a side of the damping piston facing the pressure plate;

the pressure plate having vent orifices located radially inward of the clutch damper friction element; and the clutch damper being engageable with the apply side of the pressure plate during selective engagement of the pressure plate with the input shell.

2. A damper for a selectively engageable friction clutch disposed within a torque converter functionally interposed between a vehicle engine and a vehicle transmission, comprising:

the torque converter comprising a torque converter input shell rotatively locked to the engine, an impeller fixed to the input shell, a turbine, and a stator wherein the impeller, the input shell, and the stator are disposed relative to one another to accommodate a toroidal flow pattern, said turbine including a turbine hub, the turbine hub including spline means on an inside diameter thereof for connecting to an output element and spline means on an outside diameter for connecting to a clutch hub, and a single axis of rotation for the elements of the torque converter;

the friction clutch disposed within the torque converter input shell comprising an annularly shaped pressure plate centered on the axis of rotation for selectively and axially engaging the input shell, having a release side facing the torque converter input shell, an apply side facing the turbine, and an inside diameter forming a lip for rotary support on the turbine hub; a frictional pad affixed to a release side of the pressure plate near the outer periphery; a spring engagement element rotatively fixed to the pressure plate; the clutch hub having spline means on an inside diameter for engaging external diameter spline means of the turbine hub, both rotatively fixing and permitting linear motion relative to the turbine hub, and having a plurality of spring openings near its outer periphery to accommodate spring means and having axially extending lugs; and spring means disposed between the clutch hub and the clutch pressure plate for rotatively linking the clutch pressure plate through the spring engagement element with the clutch hub through the spring openings and oriented so as to compress axially when torque is transmitted between the clutch hub and the clutch pressure plate; and the torque converter clutch damper comprising a damping piston disposed adjacent to the apply side of the pressure plate and being axially positioned in close proximity to the pressure plate by the spring means, and being rotatively locked to the clutch hub through a plurality of openings which are disposed for engagement with the axially extending lugs of the clutch hub; a friction element fixed on a side of the damping piston facing the pressure plate; and the pressure plate having vent orifices located radially inward of the friction element.

3. A damper for a selectively engageable frictional clutch disposed within a torque converter functionally interposed between a vehicle engine and a vehicle transmission, the torque converter having an input shell rotatively fixed to the engine and a torque converter output element rotatively fixed to the transmission, the clutch having a two sided pressure plate with an apply side and a release side with a friction pad, and being selectively engageable with the torque converter input shell and rotatable relative to the output element comprising:

a damper piston coaxial with the pressure plate and with a friction element fixed on a damper piston surface adjacent to the pressure plate, applied against the pressure plate by fluid pressure simultaneous to fluid pressure on the apply side of the pressure plate applying the pressure plate against the input shell, being rotatively fixed to the output element and axially movable relative to the pressure plate; and means for allowing fluid trapped radially inward of the friction element between the pressure plate and the damper piston during an apply of the clutch to escape from the apply side to the release side of the pressure plate element.

* * * * *